US010346689B2

(12) United States Patent
Max et al.

(10) Patent No.: US 10,346,689 B2
(45) Date of Patent: Jul. 9, 2019

(54) APPARATUS AND METHOD FOR CONNECTING A MOBILE DEVICE CAMERA

(71) Applicant: VOLKSWAGEN AG, Wolfsburg (DE)

(72) Inventors: Stephan Max, Gifhorn (DE); Stefan Brosig, Meine (DE); Reiner Katzwinkel, Meine (DE); Volkmar Tanneberger, Meine (DE); Mark Beckmann, Braunschweig (DE); Stefan Kollmorgen, Braunschweig (DE); Stefan Bosse, Holle (DE); Thomas Grummel, Holle (DE); Andreas Titze, Braunschweig (DE)

(73) Assignee: VOLKSWAGEN AG (DE)

( * ) Notice: Subject to any disclaimer, the term of this patent is extended or adjusted under 35 U.S.C. 154(b) by 0 days.

(21) Appl. No.: 14/926,252

(22) Filed: Oct. 29, 2015

(65) Prior Publication Data

US 2016/0125250 A1 May 5, 2016

(30) Foreign Application Priority Data

Oct. 30, 2014 (DE) ........................ 10 2014 222 190

(51) Int. Cl.
*H04N 7/18* (2006.01)
*G06K 9/00* (2006.01)
(Continued)

(52) U.S. Cl.
CPC ............ *G06K 9/00791* (2013.01); *B60R 1/00* (2013.01); *H04N 5/23206* (2013.01);
(Continued)

(58) Field of Classification Search
None
See application file for complete search history.

(56) References Cited

U.S. PATENT DOCUMENTS 5,949,345 A 9/1999 Beckert et al.
7,088,387 B1 * 8/2006 Freeman ................ H04N 5/772 348/155
(Continued)

FOREIGN PATENT DOCUMENTS

CN 201419686 Y 3/2010
CN 102291424 A 12/2011
(Continued)

OTHER PUBLICATIONS

GoPro, "BMW Group Technology Office and GoPro Create First Automotive Sports Camera Integration," Jun. 12, 2014.*
(Continued)

*Primary Examiner* — Nicholas R Wilson
(74) *Attorney, Agent, or Firm* — Barnes & Thornburg LLP

(57) ABSTRACT

An apparatus and a method for connecting a mobile camera device to a vehicle-mounted display apparatus, wherein the mobile camera device is controlled both by the driver operating the mobile camera device as well as by additional information regarding the state of the vehicle, wherein the additional information is provided by vehicle sensors. The information from the driver and the vehicle is processed by an application program on the mobile camera device and the mobile camera device is controlled. The mobile camera device can display images and/or videos and process the images and/or videos by way of the application program. The information to be processed can be displayed on the display of the vehicle-mounted display apparatus.

12 Claims, 7 Drawing Sheets

(51) Int. Cl.

| | |
|---|---|
| ***B60R 1/00*** | (2006.01) |
| ***H04N 5/232*** | (2006.01) |
| ***H04N 5/247*** | (2006.01) |

(52) U.S. Cl.

CPC ............ *H04N 5/247* (2013.01); *H04N 7/185* (2013.01); *B60R 2300/108* (2013.01); *B60R 2300/802* (2013.01); *B60R 2300/8013* (2013.01)

(56) References Cited

U.S. PATENT DOCUMENTS

| | | | | |
|---|---|---|---|---|
| 8,825,289 | B2 | 9/2014 | Daly et al. | |
| 2006/0171704 | A1* | 8/2006 | Bingle | B60R 11/04 396/419 |
| 2011/0304444 | A1* | 12/2011 | Zhang | B60K 35/00 340/425.5 |
| 2013/0121681 | A1* | 5/2013 | Lee | G03B 9/02 396/508 |
| 2013/0145279 | A1 | 6/2013 | Ricci | |

FOREIGN PATENT DOCUMENTS

| | | | |
|---|---|---|---|
| DE | 102005023544 | A1 | 12/2006 |
| DE | 102006007343 | A1 | 8/2007 |
| DE | 102010034262 | A1 | 2/2012 |
| DE | 102012008284 | A1 | 11/2012 |
| DE | 102011106838 | A1 | 1/2013 |
| DE | 102011084087 | A1 | 4/2013 |
| DE | 102012200721 | A1 | 7/2013 |
| DE | 102012209496 | A1 | 12/2013 |
| DE | 102013106212 | A1 | 12/2013 |
| DE | 102012220787 | A1 | 6/2014 |
| WO | 2005090124 | A1 | 9/2005 |

OTHER PUBLICATIONS

John Deere, "GreenStarTM 3 CommandCenterTM Display," http://salesmanual.deere.com/sales/salesmanual/en_NA/tractors/2012/feature/operator_station_and_controls/8r_8rt/gs3_commandcenter.html, Aug. 2013.*

Case GMbH, "C2BT Bluetooth wireless technology Adaptor for CAN-Bus Applications," Nov. 2012.*

Francis D'sa, "How To: Use an old smartphone or tablet as a security camera," http://www.firstpost.com/tech/news-analysis/how-to-use-an-old-smartphone-or-tablet-as-a-security-camera-3634713.html, Aug. 22, 2013.* iPhone-Based Parking Aid with Rearview Camera; downloaded from http://www.heise.de/mac-and-i/meldung/iPhone-Einparkhilfe-mit-Rueckfahrkamera-1844715.html; Apr. 18, 2013.

Schmerer; BMW Integrated Control of GoPro Camera; downloaded from http://www.cnet.de/88132125/bmw-integriert-steuerung-von-gopro-kamera/; Jun. 16, 2014.

Search Report for German Patent Application No. 10 2014 222 190.0; dated Aug. 11, 2015.

Office Action and Search Report for Chinese Patent Application No. 2015106572530; Jul. 25, 2017.

* cited by examiner

APPARATUS AND METHOD FOR CONNECTING A MOBILE DEVICE CAMERA

PRIORITY CLAIM

This patent application claims priority to German Patent Application No. 10 2014 222 190.0, filed 30 Oct. 2014, the disclosure of which is incorporated herein by reference in its entirety.

SUMMARY

Illustrative embodiments relate to an apparatus for connecting a mobile camera device and a corresponding method.

BACKGROUND

In modern vehicles, camera systems are often used to represent the different contents of a camera on a vehicle-mounted display, by way of example, a display and operating part. Both vehicle-mounted camera systems as well as mobile camera systems exist.

Previous methods frequently use vehicle-mounted camera systems, such as, by way of example, systems for observing the rear part of the vehicle or the region around the vehicle and the systems use rear and front cameras that are permanently integrated. The images from these cameras are digitally processed and are displayed in real time, for example, on a display of a vehicle-mounted radio-navigation system, or in a display part.

The cameras provide images of around the vehicle in real time on the vehicle-mounted display. The driver can, therefore, have a good view of the immediate surroundings. Camera systems of this type offer a multiplicity of perspectives and views to provide optimum support to the driver in each traffic situation.

One or multiple cameras having 180° wide angle lenses can be fitted in the front, side and rear region and thus expand the field of view of the driver from the foremost or the rearmost point of the vehicle by 90° towards the left and the right. The driver is, therefore, able to see spatial regions immediately in front, to the rear or adjacent to the vehicle that would otherwise not be visible. The system can therefore be of use by way of example in the case of difficult maneuvers, such as coupling-up and shunting, using a trailer or in terrain that makes it difficult to see when filtering into traffic.

Disclosed embodiments provide a vehicle-mounted display apparatus to connect a mobile camera device to a vehicle, a mobile device, and a method for connecting the mobile camera device.

BRIEF DESCRIPTION OF THE DRAWINGS

The disclosed embodiments are explained with reference to the attached drawings. In the drawings.

DETAILED DESCRIPTION OF THE DISCLOSED EMBODIMENTS

Figure 1:
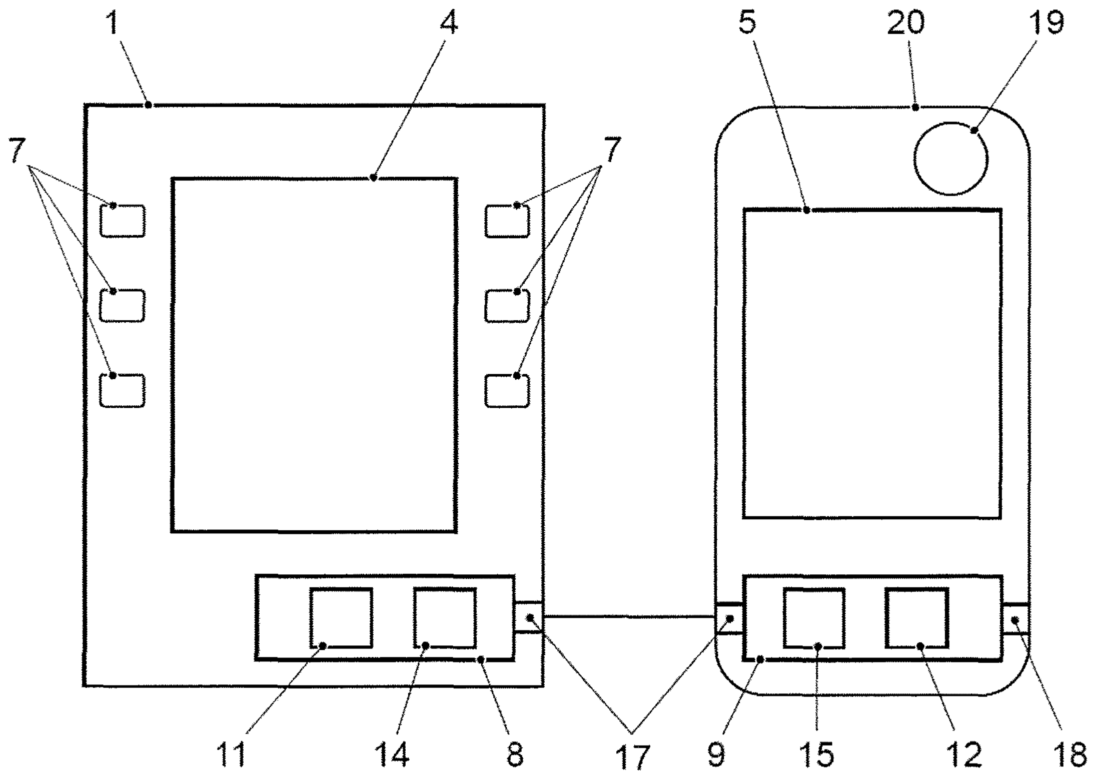
FIG. 1 illustrates schematically a vehicle-mounted display apparatus for connecting a mobile camera device to a vehicle.

The vehicle-mounted display apparatus comprises a display and an interface for connecting the vehicle-mounted display apparatus to the mobile camera device. A "mobile camera device" is a device having a camera that can be attached to arbitrary sites inside or outside the vehicle in such a manner that the camera can move. The mobile camera device can in particular be an external mobile camera, a smartphone having an integrated camera or an external mobile camera that is connected to a smartphone.

The vehicle-mounted display apparatus comprises a processing device for controlling an application program on the mobile camera device, wherein the processing device is configured in such a manner that the processing device transmits data by way of the interface to the application program and receives image data and displays the image data on the display.

It is possible to connect to the mobile display apparatus many components that are commonly available and widespread on the market.

The vehicle-mounted display apparatus is configured to process information that is provided by the vehicle and/or by a driver and to transmit the information to the application program on the mobile camera device and to control the mobile camera device in dependence upon the information.

Consequently, the mobile application program for controlling the mobile camera device is located on the mobile camera device and consequently can be tailored in a flexible manner to various requirements of different camera manufacturers. Consequently, very few or no adjustments to the vehicle-mounted display apparatus are necessary.

In at least one exemplary embodiment, the information that is provided by the vehicle can be information regarding the vehicle state. Consequently, in addition to the driver operating the external mobile camera, the information regarding the vehicle state can also be used to control the external mobile camera, whereby it is possible to control the external mobile camera in a more precise manner and to display in a more comprehensive and precise manner the information content from the external mobile camera on the display of the vehicle-mounted display apparatus.

In a further exemplary embodiment, the vehicle-mounted display apparatus can be configured so as to control the mobile camera device by means of operating elements on the display and operating part by way of the application program. As a consequence, the application program on the mobile camera device is controlled by way of the operating elements of the vehicle-mounted display apparatus, the application program for controlling the external mobile camera however is not located on the vehicle-mounted display apparatus but rather on the mobile camera device. Consequently, camera products of various manufacturers can be more easily integrated into the vehicle-mounted display apparatus using in each case different application programs.

Furthermore, the vehicle-mounted display apparatus can be configured so as to receive the image data from the mobile camera device by way of the application program in real time and to display the image data on the display. It is thereby possible for the driver to see immediately on the display important or interesting incidents that are detected by the camera and if necessary react to the incidents.

In a further exemplary embodiment, the vehicle-mounted display apparatus can be configured so as to receive the image data from the mobile camera device by way of the application program and to process the image data within the scope of an augmented reality analysis. In an augmented reality analysis, additional information is made available to the driver, the information being in addition to the raw image content. The current image or video is complemented with computer-generated additional information or virtual objects by means of blending/superimposing images. The term “augmented reality” is used in this context for an augmented reality.

Furthermore, the vehicle-mounted display apparatus is further configured so as to receive the image data from the mobile camera apparatus by way of the application program and to process the data within the scope of a traffic and safety analysis. Consequently, the driver can receive information of this type in addition to the image content, the information including the safety aspects in the surrounding traffic during the journey.

Furthermore, a mobile device having a display and an interface for connecting the mobile device to the vehicle-mounted display apparatus is provided. Furthermore, the mobile device comprises a processing device, wherein this processing device is configured so as to receive by way of the interface information from the vehicle-mounted display apparatus and to transmit image data to the vehicle-mounted display apparatus and to control a camera.

The mobile device is configured to receive information that is provided by the vehicle and/or by a driver and to control the external mobile camera in dependence upon the information that is provided by the vehicle and/or the driver using the application program.

The application program for controlling the camera is located on the mobile device and can, consequently, be tailored to various requirements of different camera manufacturers in a flexible manner. In particular, only very few or no adjustments to the vehicle-mounted display apparatus are necessary.

The mobile device can be configured so that the device comprises the camera. Consequently, the driver can connect the mobile camera directly to the vehicle-mounted display apparatus. A further mobile unit is not required in this case.

In a further exemplary embodiment, the mobile device can comprise a second interface for communicating with the mobile camera, wherein the mobile camera is now an external camera with respect to the mobile device. Consequently, the external mobile camera can be connected to the mobile device by way of a specific interface having suitable characteristics. By way of example, a second interface of this type can be a wireless WLAN interface.

Furthermore, a method for connecting a mobile camera device to a vehicle is provided, the method comprising the step of transmitting data by way of an interface from a vehicle-mounted display apparatus to an application program on the mobile camera device so as to control the mobile camera device.

The application program processes the data and it is not necessary to fit the vehicle-mounted display apparatus to process the data.

Furthermore, the method comprises the step of processing the data in the application program and controlling the mobile camera device by way of the interface.

This step is used for the purpose of ensuring that the mobile camera device is operated by the application program and consequently it is possible to take into account in a simple manner the requirements of various camera manufacturers.

In addition, image data from the mobile camera device can be transmitted to the application program on the mobile camera device.

Consequently, the image that is detected by the camera can be processed on the mobile camera device and can be provided for relaying to the vehicle-mounted display apparatus.

Subsequently, the image data is transmitted from the application program to the vehicle-mounted display apparatus and the image data is displayed on a display.

The method can transmit information from the vehicle-mounted display apparatus for processing to the application program on the mobile camera device so as to control the mobile camera device in dependence upon the information from the vehicle-mounted display apparatus.

FIG. 1 illustrates a vehicle-mounted display apparatus 1 with which a mobile device 20 can be connected to a vehicle. The vehicle-mounted display apparatus 1 comprises a display 4 on which by way of example it is possible to display data from an information system of the vehicle. Furthermore, the vehicle-mounted display apparatus 1 comprises a processing device 8 with which the information from the driver can be processed by way of the operating elements 7. Furthermore, the processing device 8 can process information that is provided by the vehicle and is available by way of various sensors. Sensors of this type include by way of example velocity sensors, GPS receivers for establishing the current position of the vehicle, brightness sensors or rain sensors. The intention of the driver can be better determined and supported by means of processing the information that is provided by the driver together with the information that is provided by the vehicle.

For this purpose, the processing device 8 can comprise a storage device 11 and a processor device 14, wherein by way of example, the processor device 14 can implement the programs that are located on the storage device 11 to provide functions of the display apparatus 1. Furthermore, the processing device can transmit and/or receive data by way of an interface 17. The interface 17 can for example comprise an interface that functions on the basis of MirrorLink, a USB interface, a Bluetooth interface, a vehicle bus interface, an Ethernet interface, an RS232 interface and/or a WLAN interface.

The vehicle-mounted display apparatus 1 can be coupled by way of the interface 17 to a mobile device 20. The mobile device 20 comprises a display 5 for displaying information from the mobile unit 20 and/or the vehicle-mounted display apparatus 1. The mobile device 20 furthermore comprises a processing device 9 having a processor device 15 and a storage device 12. Furthermore, the mobile device 20 comprises a camera 19 and it is possible to record images or films using the camera. These images or films can subsequently be stored in the storage device 12 on the processing device 9 and/or can be processed by the processor device 15. The processing device 9 is embodied so as to implement an application program (“App”), the application program being located in the storage device 12 on the processor device 15, the application program processes information regarding an image or film that is recorded by the camera 19 and transmits the information by way of the interface 17 to the vehicle-mounted display apparatus 1 and receives information from the vehicle-mounted display apparatus 1 and analyses this information. Furthermore, the mobile device 20 can be further fitted with a second interface 18 with which it is possible to transmit and receive data.

Consequently, the application program can control the mobile device 20, by way of example wherein the application program provides commands for adjusting the camera 19 or starts or stops a video recording. The camera 19 receives the commands that are provided by the application program. To generate the commands for controlling the camera 19, the application program uses information that is provided by the driver and/or by the sensor arrangement of the vehicle by way of the vehicle-mounted display apparatus 1. This information is transmitted by way of the interface 17 to the processing device 9 that contains the application program.

Figure 2:
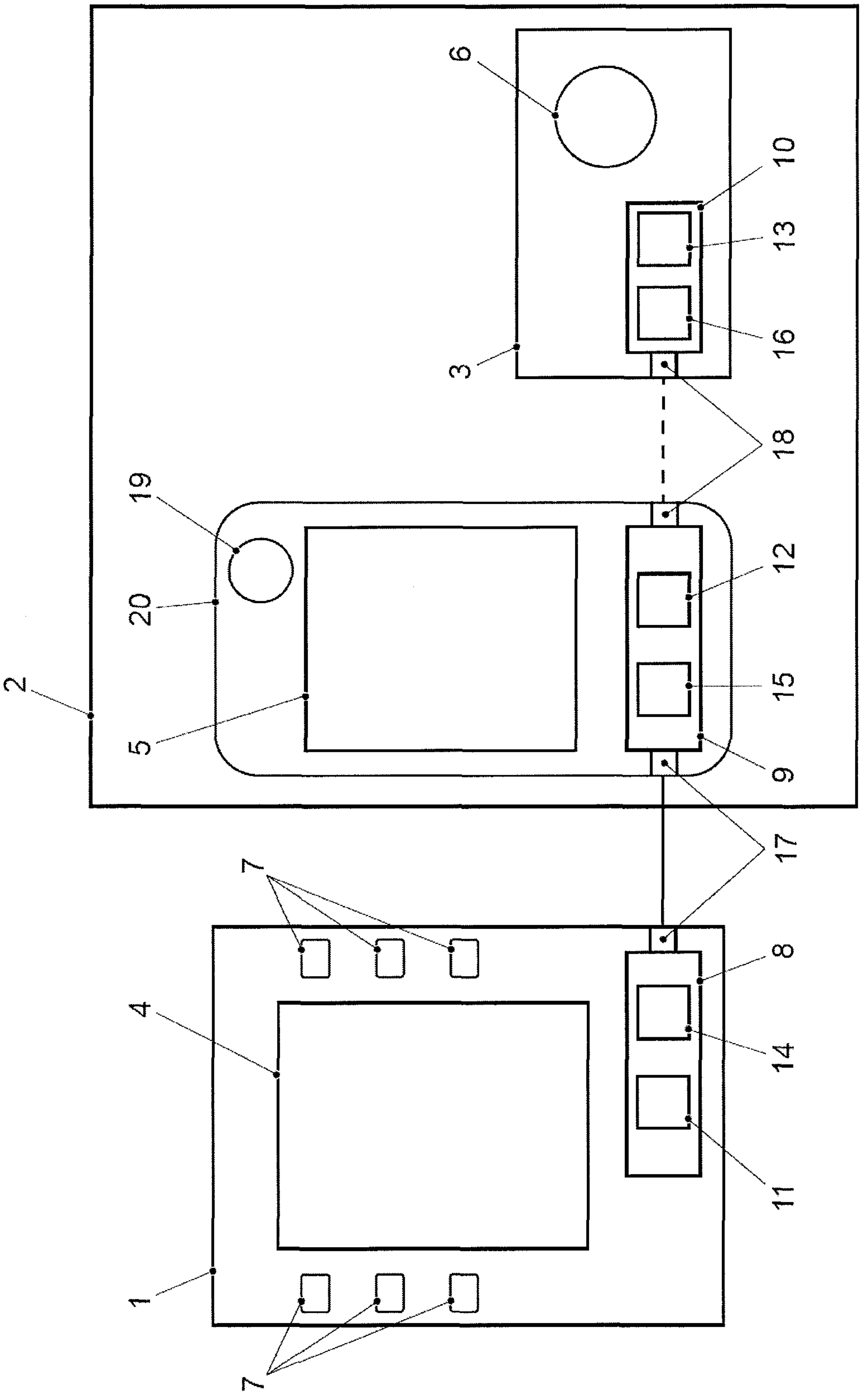
FIG. 2 illustrates a further exemplary embodiment of the vehicle-mounted display apparatus.

FIG. 2 illustrates a further exemplary embodiment of a vehicle-mounted display apparatus 1, the display apparatus being connected by way of the interface 17 to a mobile camera device 2. The mobile camera device 2 comprises the mobile device 20 and an external mobile camera 3 that is connected by way of the interface 18 to the mobile device 20.

Figure 3:
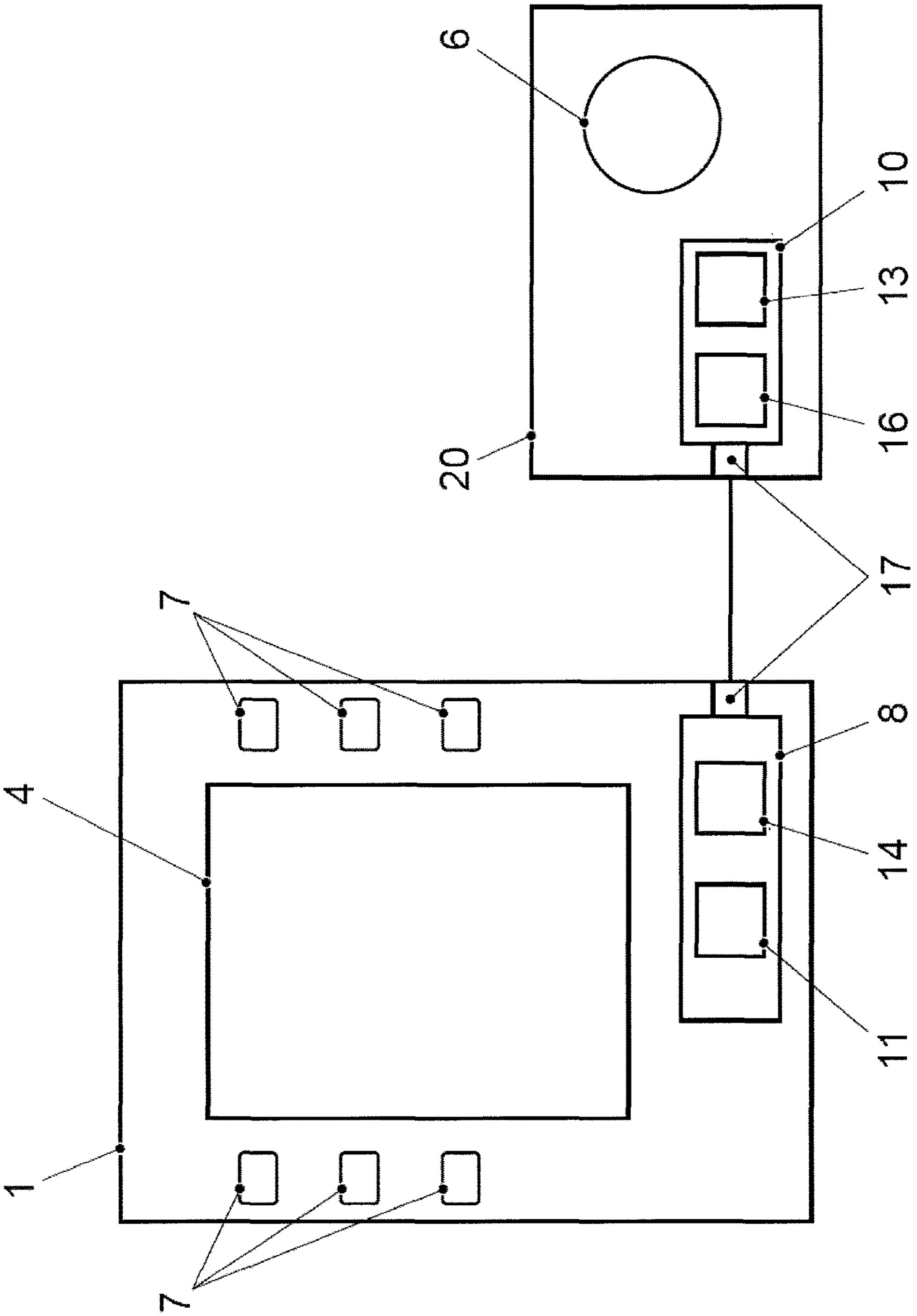
FIG. 3 illustrates a further exemplary embodiment of the vehicle-mounted display apparatus.

Functions are described that also apply in the identical manner for the apparatuses in FIGS. 1 and 3. All the descriptions of FIG. 2 can therefore be applied to the FIGS. 1 and 3. The difference between the figures is that in the case of controlling the camera 19, the camera being internally mounted in the mobile unit 20, the functions run internally in the mobile device 20. If an external mobile camera 3 is connected to the mobile device, the functions for controlling the camera run externally by way of a second interface 18.

In at least one exemplary embodiment, the second interface 18 can be a WLAN interface. Other interfaces, for example an interface that functions on the basis of MirrorLink, a USB interface, a Bluetooth interface, an Ethernet interface, an RS232 interface or a vehicle bus interface can likewise be implemented.

The external mobile camera 3 comprises a lens system 6 with which it is possible to record the images or videos. These videos or films can be processed by a processing device 10 on the external mobile camera 3. For this purpose, a storage device 13 can store the image data and/or a processor device 16 can process the images. By way of example, the processing device 10 can transmit the image data by way of the interface 18 to the mobile device 20 where the image data are received by the processing device 9. The application program on the processing device 9 can further process the image data and then by way of example transmit the image data by way of the interface 17 to the vehicle-mounted display apparatus 1 where the image data can be displayed on the display 4. The image data can be displayed in real time or the image data can be stored in the storage device 12 of the mobile device 20 or the storage device 11 of the vehicle-mounted display apparatus 1.

Furthermore, the application program can control the mobile external camera 3, by way of example start or stop the external mobile camera 3 recording images, by way of example, to record films whilst the vehicle is travelling or to stop the recording. For this purpose, the mobile external camera 3 can be attached anywhere within or outside the vehicle by way of suitable holding devices. By way of example, the driver can fasten the external mobile camera to the front windscreen to record incidents that occur in the region in front of the vehicle. Furthermore, it is possible to fasten the mobile external camera 3 outside the vehicle on the front bumper or near to the bumper, whereby by way of example, it is possible to observe the street whilst parking the vehicle. Accordingly, the external mobile camera can be fastened to the rear windscreen or the rear bumper of the vehicle.

An arrangement of this type is suitable by way of example for recording and storing videos during the journey on thoroughfares or during journeys on terrain away from paved roads, so-called off-road movies. These films can be viewed in a time-delayed manner by way of the display 4 of the vehicle-mounted display apparatus 1 or the display 5 of the mobile device 20 or can be selected on a further external device. By way of example, the mobile external camera 3 can also be controlled by way of the application program in such a manner that individual images can be recorded. In addition, the application program on the processing device 9 can be configured in such a manner that the films are recorded and stored in a virtual ring memory storage that is overwritten after a predetermined time with current images. As a consequence, particular incidents during the journey, by way of example accidents, can be documented without the need to store large amounts of data of the video for the duration of the entire journey.

In the case of the vehicle itself being involved in an accident, the recording by the camera and the associated overwriting of the ring memory storage can be automatically stopped to prevent interesting image data being deleted if the driver either forgets to stop the camera or is not able to stop the camera. The recording and the associated overwriting of old data in the ring memory storage can be stopped automatically by way of an emergency mechanism in the vehicle; the emergency mechanism detects the accident and initiates specific emergency mechanisms. The emergency mechanism can be configured in such a manner that the vehicle-mounted display apparatus 1 obtains by way of a CAN-bus in the vehicle the information regarding the occurrence of an accident and this information is relayed to the application program on the mobile device so that by way of example, the recording of the images is stopped immediately or the images continue to be recorded and the recording is only then stopped if the duration of time of the recorded image contents on the ring memory storage prior to the accident falls below a specific time.

Furthermore, the operating parameters of the external mobile camera 3 can be configured or controlled by way of the vehicle-mounted display apparatus 1, by way of example the shutter or the aperture speed can be changed, without the need to operate or touch the camera directly. The driver can comfortably configure the external mobile camera 3 in a manual manner during the journey without endangering road traffic. In the illustrated exemplary embodiment, the manual configuration is performed by way of the application program of the processing device 9 of the mobile device; the application program records the configuration commands from the vehicle-mounted display apparatus 1 by way of the interface 17, further processes the configuration commands and relays the configuration commands by way of the interface 18 to the external mobile camera 3.

In addition, it is possible with the arrangement that is illustrated in FIG. 2 to process image data from the external mobile camera 3 in real time and to display the image data on the display 4 of the vehicle-mounted display apparatus 1. The driver thereby has the possibility of seeing what the external mobile camera is currently recording at an arbitrary point in time and without a time delay. In dependence upon the position of the camera within or outside the vehicle, the driver can consequently use the information that is obtained to react to the information and by way of example to adjust his vehicle behavior. In at least one exemplary embodiment, the camera can be fastened in the interior of the vehicle in such a manner that children who are located in the vehicle can be observed. In a further exemplary embodiment, the camera can be mounted outside the vehicle in a horse trailer to thus identify the state of the horses and to promptly identify possible problems during the journey. Furthermore, the mobile camera device 2 can be configured in such a manner that the image data of the external mobile camera 3, the image data being displayed in real time, is only then displayed on the display 4 if the driver actuates an accordingly configured operating element 7. The image data can then be displayed over a specific period of time that can be configured, by way of example 3 seconds, and afterwards the display of the image data is ended. The driver therefore has the possibility, depending upon the requirement, of quickly taking into account the current images that are being transmitted in real time and afterwards returning to another content of the display 4.

Furthermore, the mobile camera device 2 can be configured in such a manner that the display of the image content of the external mobile camera 3 is automatically switched on if the vehicle is in a specific vehicle state or driving mode. By way of example, the camera can be fastened to the rear windscreen or to the rear bumper and in the case of a reverse gear being selected the real time display of the images that are recorded by the external mobile camera 3 are automatically displayed on the display 4 of the vehicle-mounted display apparatus 1. The images can be displayed by way of example until the vehicle achieves a specific threshold velocity, by way of example 15 km/h and afterwards the display of images is automatically switched off by the application program. The camera can be automatically switched off in the case of achieving a specific threshold velocity both for driving the vehicle in reverse as well as driving the vehicle forwards.

Furthermore, specific parameters of the external mobile camera 3 can be automatically controlled by way of a brightness sensor that is integrated into the vehicle and is connected by way of CAN-bus to the vehicle-mounted display apparatus. As a consequence, by way of example the aperture of the camera can be automatically controlled during the journey without the need for the driver to manually apply settings.

Furthermore, the mobile camera device 2 can be configured in such a manner that the mobile camera device can be used as a parking aid. For this purpose, the external mobile camera 3 can be fastened by way of example to the rear bumper in such a manner that the limits of the road and/or a further vehicle that is located to the rear of the vehicle can be taken into account. The external mobile camera 3 can be automatically activated by way of example if the reverse gear is selected.

In a further exemplary embodiment, the external mobile camera 3 can be mounted on the vehicle in such a manner that an unclear road situation, by way of example a road corner that cannot be seen by the driver, can be taken into account by way of the camera. For this purpose, the mobile external camera 3 can be fastened by way of example by a suitable holding device to an end region of the front bumper.

In a further exemplary embodiment, the mobile camera device can be used within the scope of analyses of an augmented reality or "AR". The term is understood to mean the computer-supported augmentation of the perception of reality of a user, wherein excess information is provided in addition to the perception of the user. This information can respond to all the senses of the user. Frequently, the term "augmented reality" is understood to mean for example the visual display of information, in other words complementing images or videos with computer-generated additional information or virtual objects by means of blending and/or superimposition. If by way of example within the scope of a navigation, the images of the external mobile camera 3 are transmitted in real time to the display 4, navigation directions can be projected onto the image so that by way of example turning instructions appear on the road. Consequently, the analysis of the augmented reality can support and refine the functions of the navigation system by means of determining additional information.

This additional data can be determined by way of the application program on the mobile device 20, wherein the mobile device can be connected to the internet and data that are used to calculate the additional information can be drawn from an external data bank on the internet.

At least one exemplary embodiment of the augmented reality analysis is the vehicle finder. The position of the parked vehicle is stored by way of the application program on the mobile device 20. If the driver is away from the vehicle and has the mobile device with them, the driver can find the position with the aid of the vehicle finder. The mobile device 20 can display to the driver the direction of the parked vehicle, the street name and the current distance of the vehicle in the display 5.

Furthermore, in at least one exemplary embodiment the mobile camera device 2 can be used with the vehicle-mounted display apparatus 1 for the purpose of storing image contents of a journey that are recorded by the camera or the Google Street View image contents of the journey and depositing the images in a data bank that comprises further image contents of other journeys. Consequently, it is possible to store a multiplicity of image data of various journeys.

The mobile camera device 2 can also be used in a further exemplary embodiment for a traffic and safety analysis. For this purpose, the mobile camera device 2 by way of example can be used to observe the face of the driver and in particular the eyes and using a suitable application program by means of comparing with movement patterns observe whether the driver is becoming tired and consequently whether there is a risk of a micro sleep. This risk can be increased in particular in the case of long distance journeys in darkness or in conditions that remain the same and long straight journeys because as a consequence the attention of the driver decreases and the monotony additionally increases the risk of the drive falling asleep. If the mobile camera device establishes that as a result of a changed movement pattern of the face and/or the eyes, there is a risk of a micro sleep, the vehicle-mounted display apparatus 1 can output a signal tone that warns the driver.

Furthermore, the vehicle-mounted display apparatus 1 can be used together with the mobile camera device 2 for the purpose of observing the movement of traffic in the vicinity of the vehicle. By way of example, the camera can establish the vehicle density of the traffic that surrounds the vehicle and can derive information therefrom, by way of example information regarding the probable arrival time of the vehicle at the intended destination.

During the journey, the mobile camera device 2 can also be used for the purpose of making telephone calls with video support, wherein the external mobile camera 3 can be used for the purpose of recording the driver or one or multiple further persons in the vehicle that are taking part in the telephone call and for providing the video data within the scope of the telephone call.

Furthermore, photos and videos that are recorded by way of the mobile camera device 2 can be provided by way of corresponding virtual platforms to make the recorded images or videos available to users. For this purpose, the photos or the videos can be copied by way of an internet interface to corresponding platforms.

Furthermore, the mobile camera device 2 can be used to improve the view of the driver in darkness. A night assistant of this type can be implemented in such a manner that an infrared light is implemented on the external mobile camera 3; the infrared light illuminates the surroundings and by way of an infrared sensor that can be part of the mobile external camera 3 the image of the surroundings that is illuminated in this manner is recorded and it is possible to improve the view for the driver. The oncoming traffic is not dazzled using the night view technique since the infrared light is not visible to human eyes. Furthermore, the external mobile camera 3 can be configured in such a manner that the mobile camera records the infrared radiation that is emitted by objects as an image or a video. Warmer objects, by way of example living creatures can thereby stand out from their colder surroundings as light objects.

Furthermore, the mobile camera device 2 can be configured in such a manner that the mobile camera automatically identifies traffic signs and displays the signs on the display 4. The external mobile camera 3 can record the road edge and relay the images to the application program. The application program can be fitted with an image processing program that is configured so as to investigate images in relation to known patterns that are characteristic for traffic signs. The image processing program determines then the meaning of the traffic sign and makes the information available to the driver by way of the display 4.

In a further exemplary embodiment, the mobile camera device 2 can be configured in such a manner that the mobile camera device identifies that the moving vehicle has deviated from the lane and assumes the function of a lane keeping assistant, wherein this function is implemented in a corresponding part of the application program. The mobile camera device 2 determines by way of the application program the lane in that the mobile external camera 3 records the road and compares it with specific patterns of the lane. In the case of a deviation of the vehicle from the lane, the lane keeping assistant can output a warning signal on the display 4 and/or warn the driver by means of an acoustic warning signal.

FIG. 3 illustrates a further exemplary embodiment of a vehicle-mounted display apparatus 1, wherein in this case, the external mobile camera 3 is connected by way of the interface 17 directly to the vehicle-mounted display apparatus. The application program is implemented so as to control the external mobile camera 3 in its processing device 10. The mobile device 20 is not required and consequently the entire arrangement is simplified in comparison to the entire arrangement illustrated in FIG. 2. All functions apply for the entire arrangement in FIG. 3 in the same manner as is described in FIG. 1 and FIG. 2.

Figure 4:
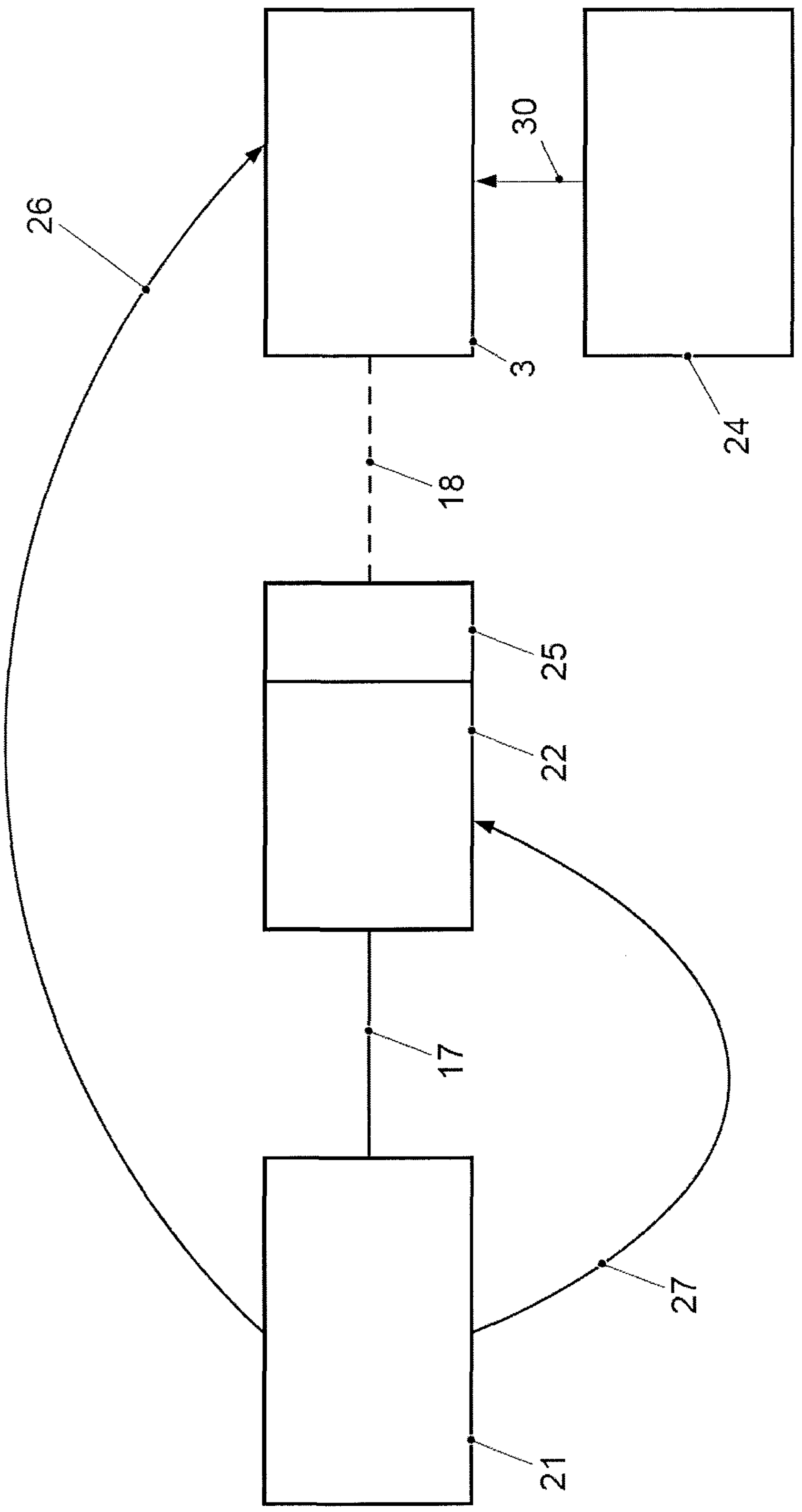
FIG. 4 illustrates a further exemplary embodiment of the vehicle-mounted display apparatus.

FIG. 4 illustrates a schematic arrangement of a modular information building block and a display and operating part that is connected to a customer mobile network device 22 by way of the interface 17. It is illustrated schematically that the modular information building block/display and operating part 21 controls the customer mobile network device 22 by means of vehicle sensors and data of the vehicle 27, wherein the application program 25 on the customer mobile phone device 22 processes the data. The control 26 of the external mobile camera can be performed directly by the modular information building block/display and operating part 21 with reference to vehicle sensors and data. The external mobile camera 3 can be connected by way of the second interface 18 to the customer mobile network device 23. The batteries of the customer mobile network device 23 can be supplied with energy by way of a charging shell 24 and a USB current supply 30.

Figure 5:
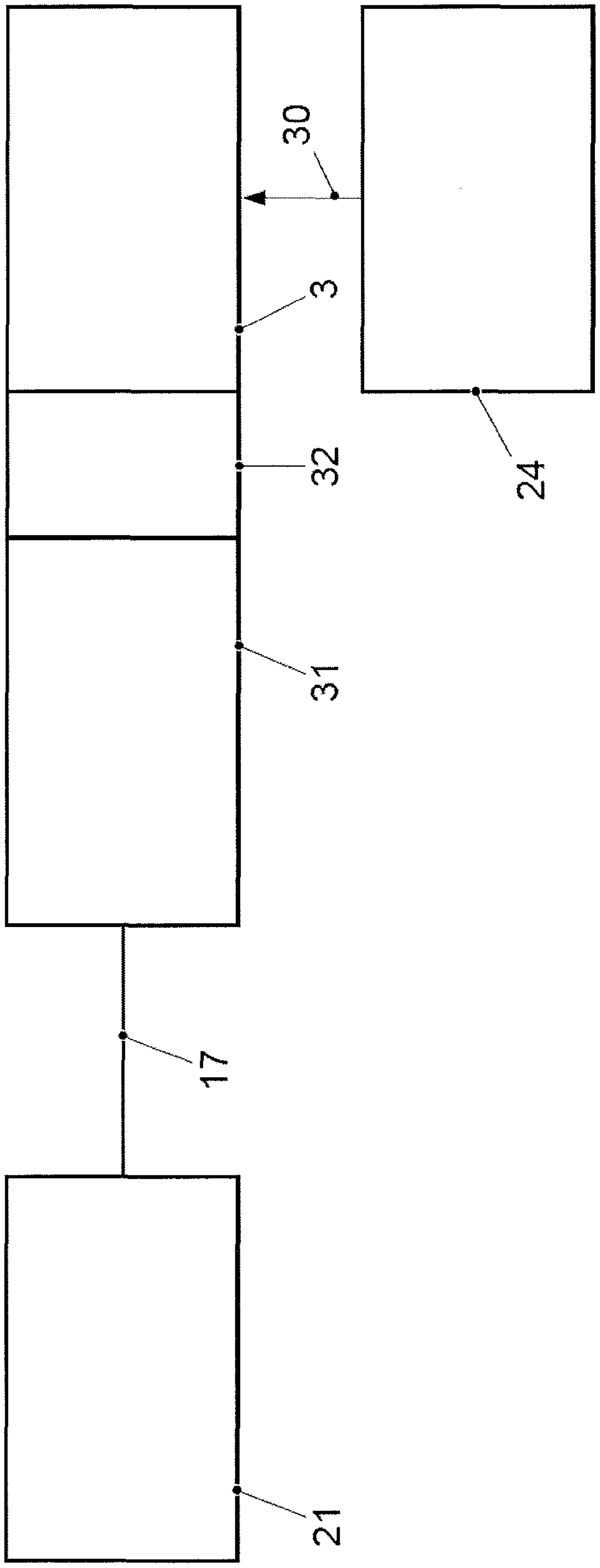
FIG. 5 illustrates a further exemplary embodiment of the vehicle-mounted display apparatus.

FIG. 5 illustrates a further embodiment of the arrangement that is illustrated in FIG. 4. The external mobile camera 3 comprises an operating system 32 that by way of example can be an android operating system, and an interface connection 31. The interface connection 31 can be a MirrorLink interface connection with which the external mobile camera 3 can be connected by way of the interface 17 to the modular information building block/display and operating part 21. The current supply of the external mobile camera 3 is provided by way of a charging shell 24 and a USB current supply 30. The customer mobile network device 22 can also be used in lieu of the external mobile camera 3 if the mobile network device comprises an integrated camera.

Figure 6:
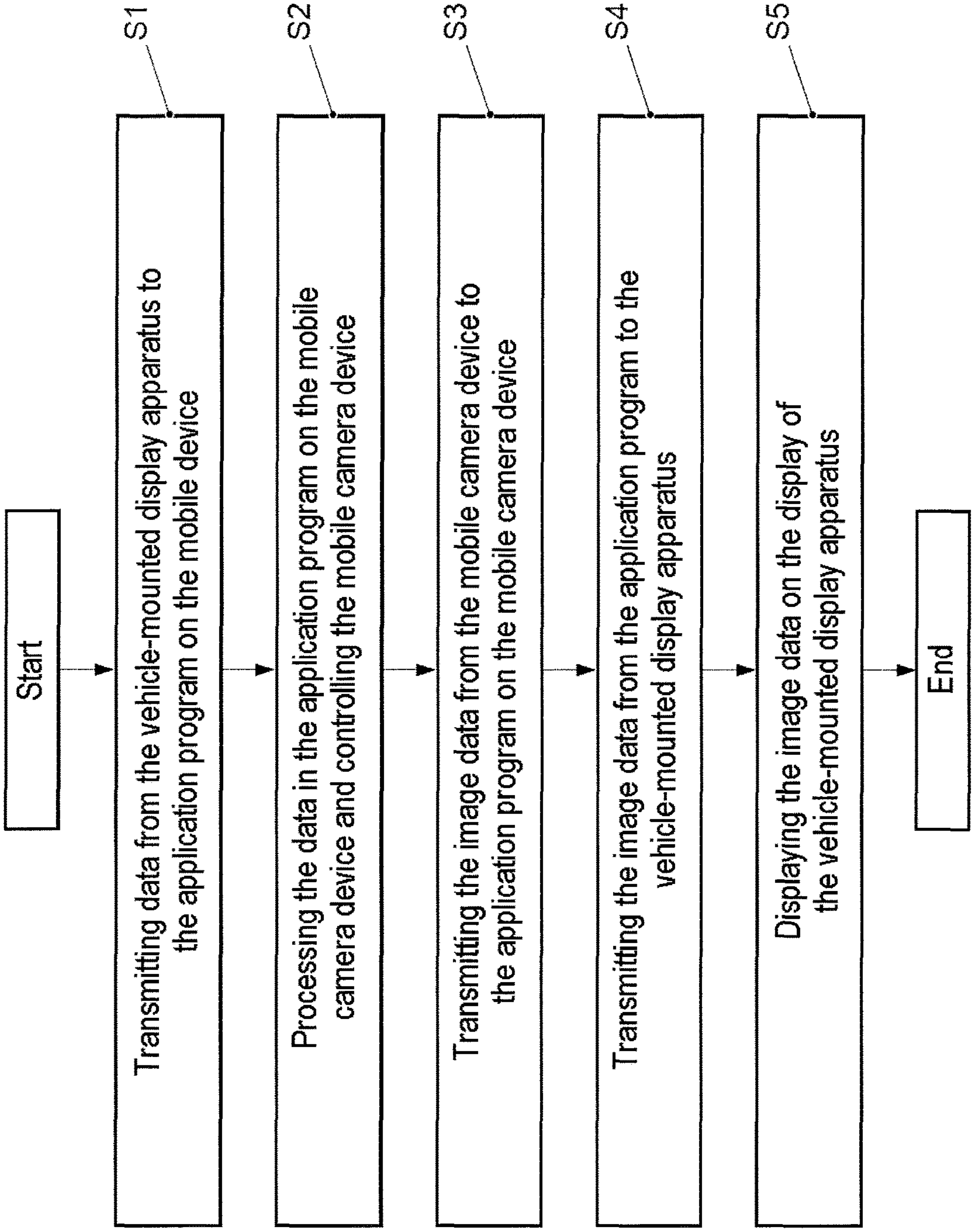
FIG. 6 illustrates a flow diagram for illustrating a method for connecting a mobile camera device to a vehicle.

FIG. 6 illustrates a method for connecting a mobile camera device to a vehicle.

In a first step S1, the data that include information that is provided by the driver and/or by the vehicle are transmitted by way of an interface from the vehicle-mounted display apparatus to the application program on the mobile camera device.

In a second step S2, the data that is received is processed in the application program that is located on the storage device of the processing apparatus of the mobile camera device. The processing of the data that are generated by way of the vehicle sensor system and input information of the driver by way of the operating elements on the vehicle-mounted display apparatus are processed using the application program on the mobile camera device. If an adjustment of the software is necessary, this can be performed on the mobile camera device; an adjustment on the vehicle-mounted display apparatus or another part of the vehicle is not necessary.

In at least one exemplary embodiment, the mobile camera device can comprise a mobile device and an external mobile camera. The data that are to be processed can be used for the purpose of controlling the external mobile camera that can be connected by way of a further interface to the mobile device. The application program can control the external mobile camera, wherein the commands can be provided for controlling vehicle sensors and/or the vehicle-mounted display apparatus.

In a further step S3, the image data of the mobile camera device are transmitted to the application program on the mobile camera device. At that location, the image data are processed and provided for a further use.

If the mobile camera device comprises the mobile unit and the external mobile camera, the external mobile camera can transmit the image data to the mobile unit where the data can be processed and provided for a further use.

In a step S4, the image data are transmitted by the application program on the mobile camera device by way of an interface to the vehicle-mounted display apparatus.

In a further step S5, the image data is displayed on the vehicle-mounted display apparatus. The image data can be displayed in real time or in a time-delayed manner. In a further exemplary embodiment, the image data can be stored in a storage device. For this purpose, by way of example the application program can use the storage device in the processing device of the mobile unit or the storage device in the processing device of the external mobile camera. It is likewise possible to store the image data on the storage device of the processing device of the vehicle-mounted display apparatus. It is possible to use either a linear storage device or a virtual ring memory storage device.

Figure 7:
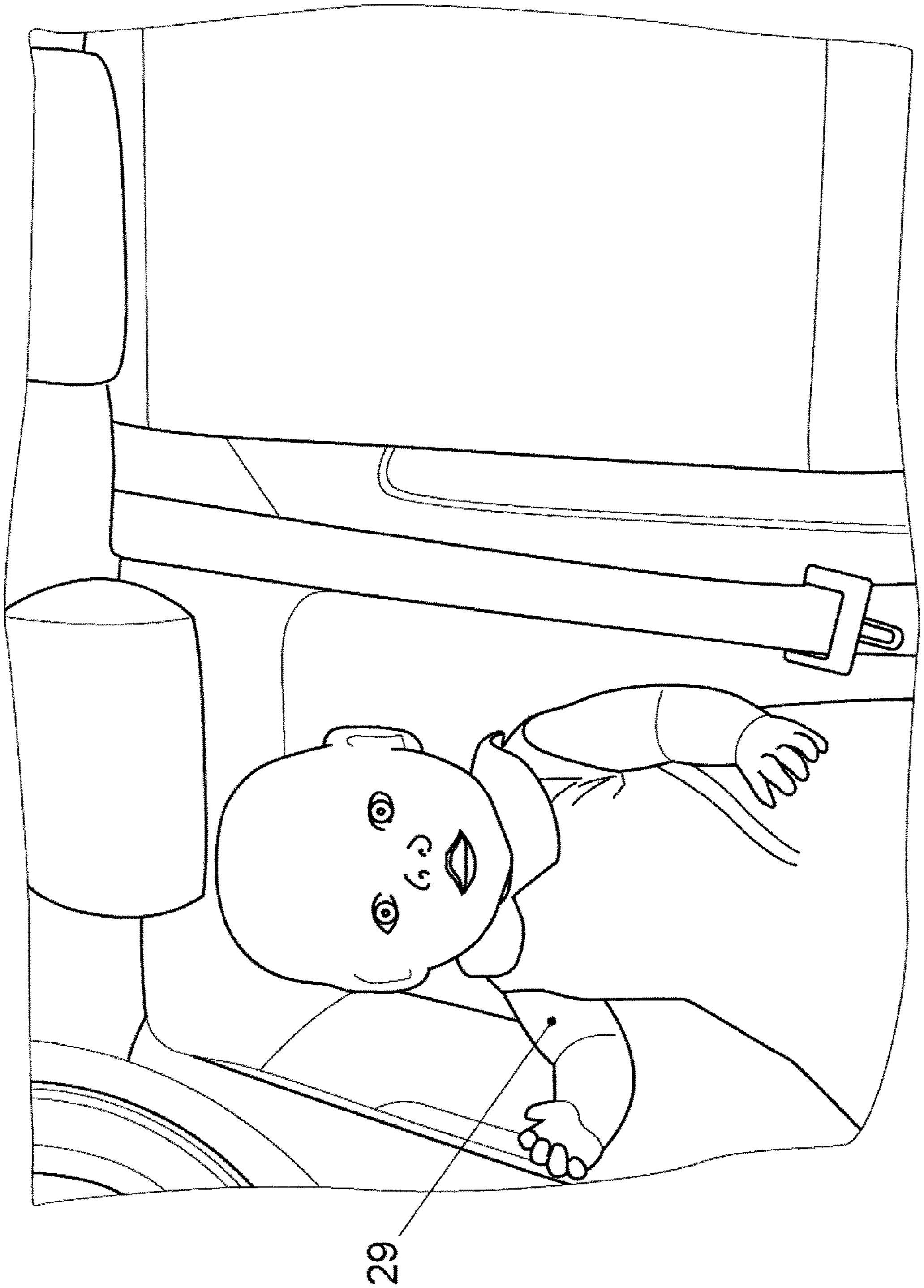
FIG. 7 illustrates the view of the mobile camera device for observing a child.

FIG. 7 illustrates an integrated display of a field of view of the mobile camera device 2 for observing a child. The mobile camera device 2 can be fastened by way of a holding device in such a manner that the camera device is orientated in the direction of the child seat and records the movements of the child 29. The application program on the mobile camera device 2 can receive the recorded image or the video of the child 29, process the image and provide the image for display on the display 4 of the vehicle-mounted display apparatus 1.

In modern vehicles, camera systems are often used to represent the different contents of a camera on a vehicle-mounted display, by way of example, a display and operating part. Both vehicle-mounted camera systems as well as mobile camera systems exist.

Previous methods frequently use vehicle-mounted camera systems, such as, by way of example, systems for observing the rear part of the vehicle or the region around the vehicle and the systems use rear and front cameras that are permanently integrated. The images from these cameras are digitally processed and are displayed in real time, for example, on a display of a vehicle-mounted radio-navigation system, or in a display part.

The cameras provide images of around the vehicle in real time on the vehicle-mounted display. The driver can, therefore, have a good view of the immediate surroundings. Camera systems of this type offer a multiplicity of perspectives and views to provide optimum support to the driver in each traffic situation.

One or multiple cameras having 180° wide angle lenses can be fitted in the front, side and rear region and thus expand the field of view of the driver from the foremost or the rearmost point of the vehicle by 90° towards the left and the right. The driver is, therefore, able to see spatial regions immediately in front, to the rear or adjacent to the vehicle that would otherwise not be visible. The system can therefore be of use by way of example in the case of difficult maneuvers, such as coupling-up and shunting, using a trailer or in terrain that makes it difficult to see when filtering into traffic.

By way of example, DE 10 2011 106 838 A1 describes a method for displaying critical traffic situations in a vehicle, wherein a camera can display the traffic situation and thereby by way of example the space with respect to an approaching vehicle is determined and thus the extent of the danger in which the vehicle is in is established.

Currently, external mobile cameras are also more frequently used in vehicles. These cameras can be fastened to many sites within or outside the vehicle as a result of their compact form and by way of corresponding holding devices and thus the cameras fulfill the specific requirements and desires of the driver more efficiently.

According to the current prior art, it is possible to connect external mobile cameras to smartphones that are fastened to the driver console. By way of example, DE 10 2013 106 212 A1 discloses integrating a wireless camera of a mobile apparatus in a vehicle, wherein the camera records the image data and transmits the data to a transceiver, wherein the transceiver relays the image or video information to an integrated vehicle cabin display where this information is displayed as images or videos.

Furthermore, the company DNT offers a parking aid having a smartphone connection. This information was provided on the internet under the title "iPhone-Einparkhilfe für Rückfahrkamera" (iPhone parking aid for reversing camera) on the 18 Apr. 2013 by the internet service heise.de. The mobile camera arrangement comprises a license plate carrier into which a wide angle camera is integrated. The wide angle camera can detect a region of up to 105 degrees in the horizontal direction and 70 degrees in the vertical direction, wherein light diodes that are integrated into the license plate holder illuminate the region during darkness. A WLAN (wireless local area network) module is located in the license plate holder, and contact can be established to a smartphone using the WLAN module, the smartphone being fastened on the driver console next to the driver. The WLAN connection can then be established between the wide angle camera and the smartphone by way of an application program. Consequently, the driver is able to use this arrangement for parking or reversing in general.

Furthermore, the publication "BMW integriert Steurung von GoPro-Kamera" (BMW integrates control of GoPro camera) by Kai Schmerer discloses integrating an external mobile camera that has the vehicle information and operating system. In the described arrangement it is possible to control the camera in a wireless manner. The camera can be mounted inside or outside the vehicle, possibly on the bumper, on the roof or on an exterior mirror. The driver can not only determine the start and the end of a recording by way of a menu that is illustrated on the onboard monitor, but rather can also adjust the recording mode. Video and single image recordings and also photo series having a shorter or a longer frequency are available for selection. Furthermore, there are specific modes for different driving situations such as night driving or for negotiating bends in the road so as to optimize the image quality. Furthermore, the camera can be switched on and off by way of the operating system, the state of charge of the rechargeable battery is likewise displayed on the screen as is the strength of the WLAN signal and the recording capacity that remains available. A smartphone is used to connect the camera, the smartphone being connected to the information and operating system and connects the mobile camera by way of WLAN.

According to the current prior art it is also possible to control the external mobile camera by way of a smartphone and/or an operating system, wherein the driver or another person in the vehicle assumes the control. There are, however, also applications where it is desirable to use information provided by the vehicle in addition to the input of the person to control the camera or to adjust a display of the camera images. By way of example, this can include the velocity of the vehicle, the time of day or night or also characteristic features in the surrounding area of the vehicle and the data can be transmitted and the external mobile camera controlled automatically.

Based upon the above described prior art, the disclosed embodiments provide an apparatus with which it is possible to integrate information provided by the vehicle into the control of an external mobile camera.

LIST OF REFERENCE NUMERALS

1 Vehicle-mounted display apparatus
2 Mobile camera device
3 External mobile camera
4 Display
5 Display
6 Lens system
7 Operating element
8 Processing device

9 Processing device
10 Processing device
11 Storage device
12 Storage device
13 Storage device
14 Processor device
15 Processor device
16 Processor device
17 Interface
18 Second interface
19 Camera
20 Mobile device
21 Modular information building block/display and operating part
22 Customer mobile network device
24 Charging shell
25 Application program
26 Control of the camera with reference to vehicle sensors and data
27 Control of the functions within the application program by means of the vehicle sensors and data
29 Child
30 USB current supply
31 Interface connection
32 Operating system
S1-S5 Method steps

The invention claimed is:

1. A vehicle-mounted display apparatus for connecting a mobile camera device to a vehicle, the apparatus comprising:
- a display;
- an interface for connecting the vehicle-mounted display apparatus to the mobile camera device; and
- a processing device for controlling an application program on the mobile camera device, wherein the processing device, by way of the interface, transmits vehicle sensor data to the application program, receives image data and displays said image data on the display,
- wherein the vehicle-mounted display apparatus processes information provided by the vehicle and transmits said information to the application program on the mobile camera device, and the application program controls the mobile camera device based upon the information,
- wherein the information provided to the application program on the mobile camera device is information regarding the vehicle state,
- wherein the mobile camera device is an external mobile camera that is wirelessly connected to a smartphone, and
- wherein the application program is configured to control cameras made by a plurality of different manufacturers so that no adjustments are made to the vehicle-mounted display apparatus in response to operation of a different external mobile camera,
- wherein the information regarding the vehicle state is provided independent of driver input, and
- wherein the vehicle state is determined by sensors in the vehicle,
- wherein the sensors comprise brightness sensors, and wherein an aperture of the external mobile camera is controlled by the brightness sensors.

2. The vehicle-mounted display apparatus of claim 1, wherein the vehicle-mounted display apparatus is further configured to control, by way of the application program, the mobile camera device by operating elements on the vehicle-mounted display apparatus.

3. The vehicle-mounted display apparatus of claim 1, wherein the vehicle-mounted display apparatus is further configured to receive the image data from the mobile camera device by way of the application program in real time and to display said image data on the display.

4. The vehicle-mounted display apparatus of claim 1, wherein the vehicle-mounted display apparatus is further configured to receive, by way of the application program, the image data from the mobile camera device and to process said image data within a scope of an augmented reality analysis.

5. The vehicle-mounted display apparatus of claim 1, wherein the vehicle-mounted display apparatus is further configured to receive, by way of the application program, the image data from the mobile camera device and to process said data within a scope of a traffic and safety analysis.

6. The mobile device of claim 1, wherein the processing device stores film in a virtual ring memory storage, and in response to an emergency mechanism in the vehicle detecting an accident, information related to detecting the accident is relayed to the application program so that recording of images is stopped or the recording of images is continued until a duration of time of recorded image contents on the ring memory storage falls below a specific time.

7. A method for connecting a mobile camera device to a vehicle, the method comprising:
- transmitting data by way of an interface from a vehicle-mounted display apparatus to an application program on a mobile camera device for controlling the mobile camera device;
- processing, via a processing device, the data in the application program and controlling the mobile camera device by way of the interface;
- transmitting image data from the mobile camera device to the application program on the mobile camera device; and
- transmitting the image data from application program to the vehicle-mounted display apparatus and displaying the image data on a display; and
- transmitting information from the vehicle-mounted display apparatus for processing to the application program on the mobile camera device for controlling the mobile camera device based upon the information from the vehicle-mounted display apparatus,
- wherein the information from the vehicle-mounted display apparatus provided to the application program on the mobile camera device is information regarding the vehicle state,
- wherein the mobile camera device is an external mobile camera that is wirelessly connected to a smartphone, and
- wherein the application program is configured to control cameras made by a plurality of different manufacturers so that no adjustments are made to the vehicle-mounted display apparatus in response to operation of a different external mobile camera,
- wherein the information regarding the vehicle state is provided independent of driver input, and
- wherein the vehicle state is determined by sensors in the vehicle,
- wherein the sensors comprise brightness sensors, and wherein an aperture of the external mobile camera is controlled by the brightness sensors.

8. The method of claim 7, wherein the vehicle-mounted display apparatus is controlled, by way of the application program, and the mobile camera device is controlled by operating elements on the vehicle-mounted display apparatus.

9. The method of claim 7, wherein the vehicle-mounted display apparatus receives the image data from the mobile camera device by way of the application program in real time and displays said image data on the display.

10. The method of claim 7, wherein the vehicle-mounted display apparatus receives, by way of the application program, the image data from the mobile camera device and to process said image data within a scope of an augmented reality analysis.

11. The method of claim 7, wherein the vehicle-mounted display apparatus receives, by way of the application program, the image data from the mobile camera device and to process said data within a scope of a traffic and safety analysis.

12. The method of claim 7, wherein the mobile camera device stores film in a virtual ring memory storage, and in response to an emergency mechanism in the vehicle detecting an accident, information related to detecting the accident is relayed to the application program so that recording of images is stopped or the recording of images is continued until a duration of time of recorded image contents on the ring memory storage falls below a specific time.

* * * * *